United States Patent
Clark et al.

(10) Patent No.: US 6,574,327 B2
(45) Date of Patent: Jun. 3, 2003

(54) APPARATUS AND METHOD OF PROCESSING LOCAL NUMBER PORTABILITY CALLS IN A SIGNAL TRANSFER POINT OF A TELECOMMUNICATIONS NETWORK

(75) Inventors: David M. Clark, Allen, TX (US); David E. Espenlaub, Richardson, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 10/192,242

(22) Filed: Jul. 10, 2002

(65) Prior Publication Data

US 2002/0176561 A1 Nov. 28, 2002

Related U.S. Application Data

(63) Continuation of application No. 09/517,235, filed on Mar. 2, 2000, now abandoned.

(51) Int. Cl.[7] .................................................. H04M 3/42
(52) U.S. Cl. ................................ 379/221.13; 379/221.1
(58) Field of Search ........................ 379/201.01, 207.02, 379/211.02, 221.08, 221.1, 221.12, 221.13

(56) References Cited

U.S. PATENT DOCUMENTS

| 5,598,464 | A | * | 1/1997 | Hess et al. ............. 379/211.03 |
| 5,732,131 | A | * | 3/1998 | Nimmagadda et al. 379/221.13 |
| 6,002,757 | A | * | 12/1999 | Williams et al. ....... 379/201.01 |
| 6,097,801 | A | * | 8/2000 | Williams et al. ....... 379/221.13 |
| 6,130,940 | A | * | 10/2000 | Wong et al. ............ 379/221.09 |

* cited by examiner

Primary Examiner—Harry S. Hong
(74) Attorney, Agent, or Firm—V. Lawrence Sewell; Craig A. Hoersten

(57) ABSTRACT

In a telecommunications network (1), a signal transfer point (10) receives an Initial Address Message (IAM) generated by an originating service switching point (12) according to a call from an originating subscriber (20). The IAM includes a destination number associated with a destination subscriber (22). If the destination number has not been ported, the signal transfer point (10) sends a return message to the originating service switching point (12) indicating that no changes are to be made to the IAM. As a result, the originating service switching point (12) forwards the IAM to a destination service switching point (13) for processing of the call. If the destination number has been ported, the signal transfer point (10) performs a local number portability look-up in a database (24). The signal transfer point (10) obtains a redirection number from the database (24) for transfer in a return message to the originating service switching point (16). The originating service switching point (12) includes the redirection number in the IAM message transferred to the destination service switching point (13).

12 Claims, 3 Drawing Sheets

APPARATUS AND METHOD OF PROCESSING LOCAL NUMBER PORTABILITY CALLS IN A SIGNAL TRANSFER POINT OF A TELECOMMUNICATIONS NETWORK

PRIORITY UNDER 35 U.S.C. §119(e) & 37 C.F.R. §1.78

This nonprovisional application is a continuation of and claims priority based upon the following prior United States nonprovisional patent application entitled: Apparatus and Method of Processing Local Number Portability Calls in a Signal Transfer Point of a Telecommunications Network, Ser. No. 09/517,235, filed Mar. 2, 2000, in the name of: David M. Clark and David E. Espenlaub, now abandoned, which is hereby incorporated by reference for all purposes.

TECHNICAL FIELD OF THE INVENTION

The present invention relates in general to call processing in a telecommunications network and more particularly to an apparatus and method of processing local number portability calls in a signal transfer point of a telecommunications network.

BACKGROUND OF THE INVENTION

Telecommunications networks provide a feature that allows for a subscriber to change from one telecommunications service provider to another. This feature is known as number portability. There are various techniques that have been implemented to support number portability. For example, a Local Routing Number scheme has been used but is not very practical in this environment. Call forwarding is a simple implementation but does not effectively support number portability. A Release to Point technique is available in ISUP but creates network management difficulties. Therefore, it is desirable to provide an effective and efficient number portability technique as compared to conventional approaches.

SUMMARY OF THE INVENTION

From the foregoing, it may be appreciated that a need has arisen for an improved number portability call processing scheme. In accordance with the present invention, an apparatus and method of processing local number portability calls in a signal transfer point of a telecommunications network are provided that substantially eliminate or reduce disadvantages and problems associated with conventional number portability techniques.

According to an embodiment of the present invention, there is provided a method of processing local number portability calls in a signal transfer point of a telecommunications network that includes receiving an initial address message associated with a call. A destination number within the initial address message is identified and a determination is made as to whether the destination number has been ported. If the destination number has been ported, a release with cause message is generated and returned. The release with cause message includes a substitute destination number to which the call is to be directed.

The present invention provides various technical advantages over conventional number portability techniques. For example, one technical advantage is to reduce the volume of messages for re-routed calls. Another technical advantage is to provide reduced response time for re-directed calls. Yet another technical advantage is to avoid performing upgrades to switches to support number portability. Other technical advantages may be readily ascertainable by those skilled in the art from the figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
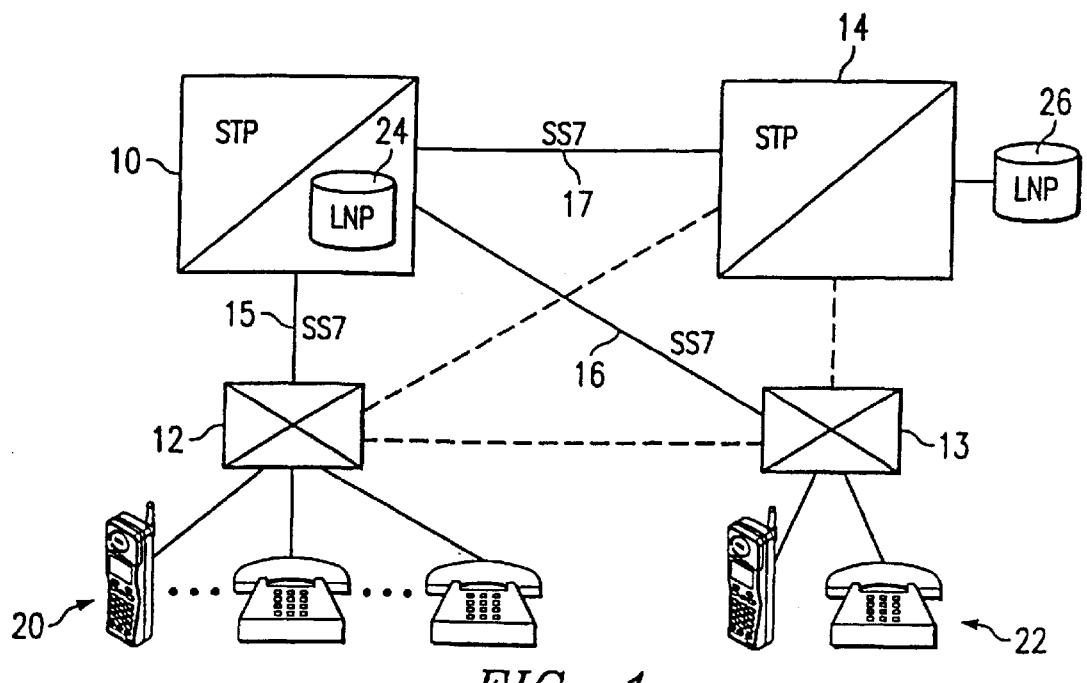
FIG. 1 illustrates a block diagram of a telecommunications network.

FIG. 1 shows a telecommunications network 1. Telecommunications network 1 includes a signal transfer point 10 coupled to one or more service switching points 12 and 13 via Signalling System Number 7 (SS7) link sets 15 and 16. Signal transfer point 10 is also coupled to at least one other signal transfer point 14 via SS7 link sets 17. Service switching points 12 and 13 are further interconnected by trunks and may include a mobile services switching center (MSC) of a wireless service provider and one or more tandem switch. Service switching points 12 and 13 are coupled to or otherwise in communication with telecommunications equipment 20 and 22 of telephone service subscribers. In order to perform local number portability (LNP), signal transfer point 10 and 14 each have access to an LNP database 24 and 26, respectively. LNP databases 24 and 26 contain the ported telephone numbers and the corresponding local routing numbers. If service switching point 12 of a service provider does not have LNP capabilities, it may have a business arrangement with another service provider who owns signal transfer point 14 to provide the LNP lookup in its LNP database 26 to obtain the local routing numbers. However, the cost of these types of arrangements are becoming cost prohibitive.

Figure 2:
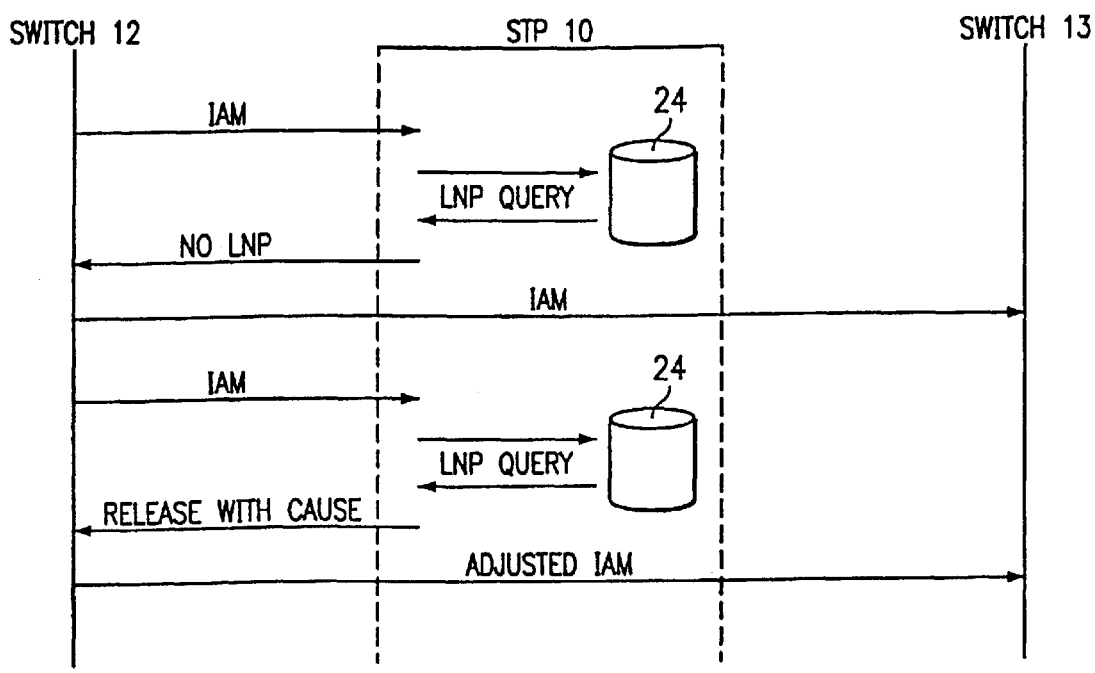
FIG. 2 illustrates a message flow in the telecommunications network.

FIG. 2 shows a message flow within telecommunications network 1. A call originates at originating subscriber 20 for processing by originating service switching point 12. Originating service switching point 12 generates and transmits an Initial Address Message (IAM) associated with the call that is intercepted by signal transfer point 10. The IAM includes a destination number associated with destination subscriber 22 serviced by destination service switching point 13. Signal transfer point 10 determines if the destination number has been ported to another telecommunications service provider. If the destination number has not been ported, signal transfer point 10 does not cause a change to the IAM. Originating service switching point 12 receives a return message from signal transfer point 10 and forwards the IAM without change in response thereto to destination service switching point 13. Destination service switching point 13 receives the IAM the call is processed accordingly in a normal fashion.

If signal transfer point 10 determines that the destination number has been ported, a query is sent to LNP database 24 for local number portability processing. LNP database 24 returns a redirection number that is placed into a return message indicating a release with cause. Signal transfer point 10 sends the release with cause return message to originating service switching point 12. Originating service switching point 12 inserts the redirection number from the release with cause return message into the IAM. Originating service switching point 12 forwards the IAM to destination service switching point 13. Destination service switching point 13 terminates the call according to the redirection number in the IAM.

Figure 3A:
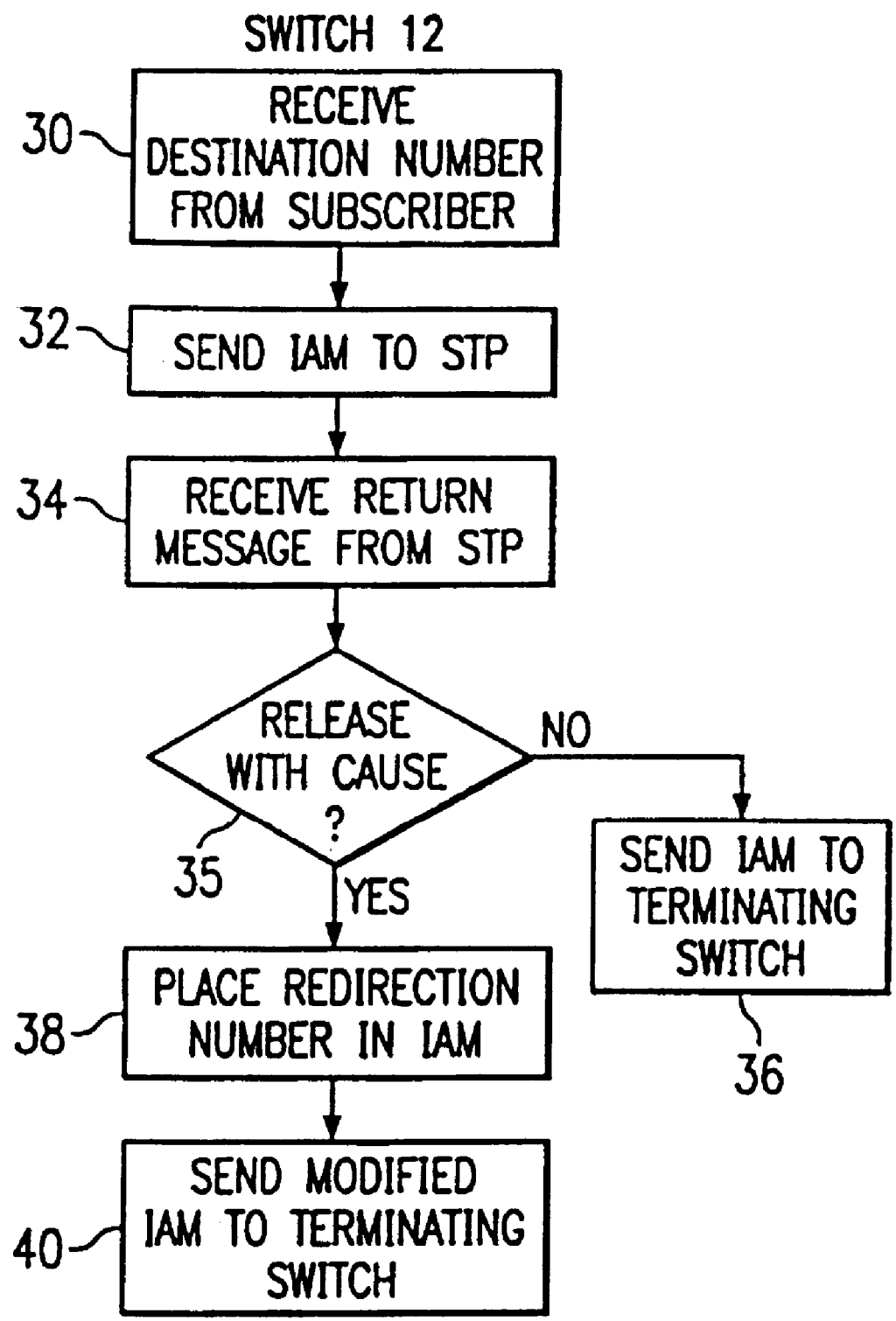
FIGS. 3A–C illustrate flow diagrams of the processes performed at each element in the telecommunications network.
Figure 3B:
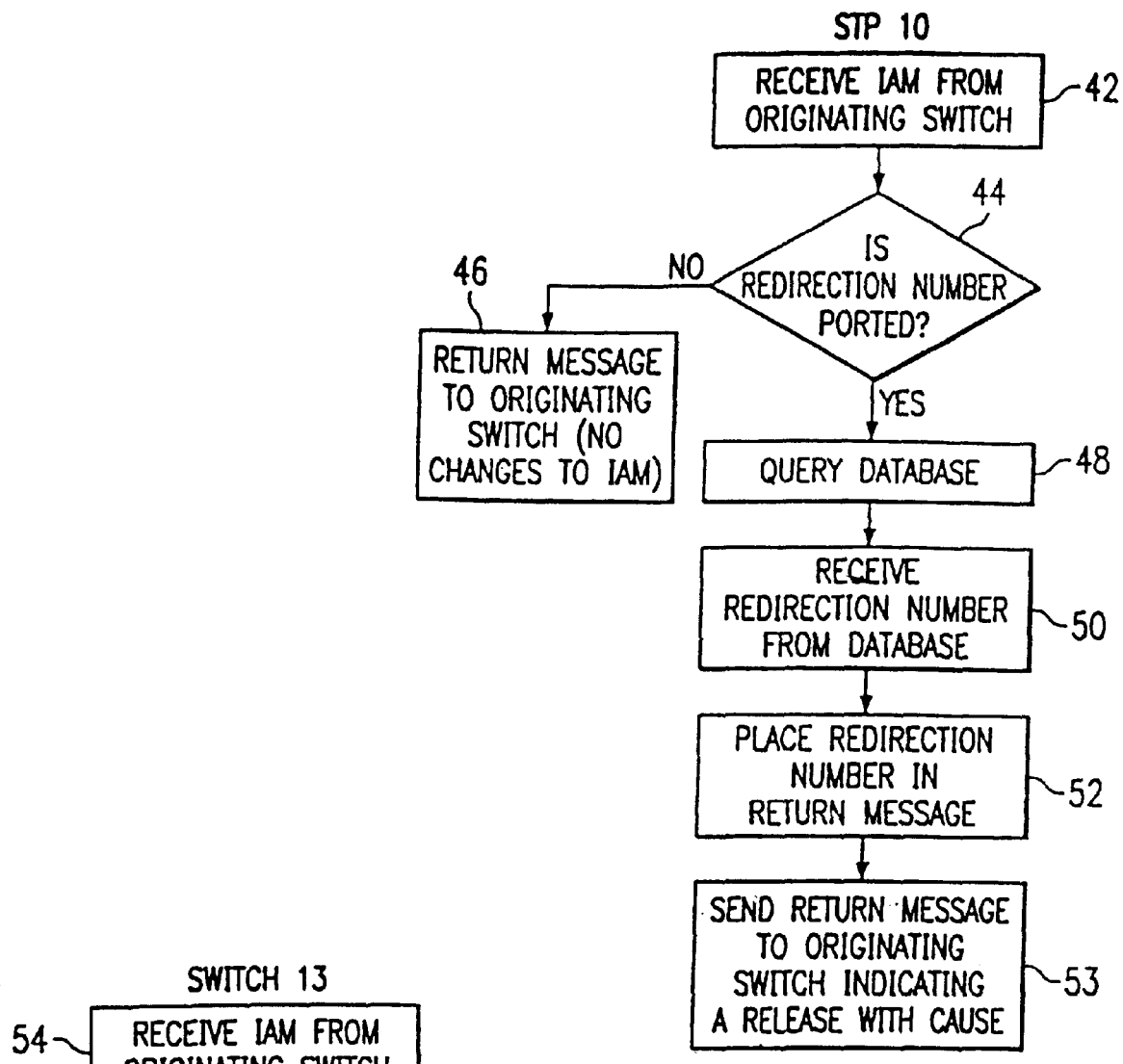
Figure 3C:
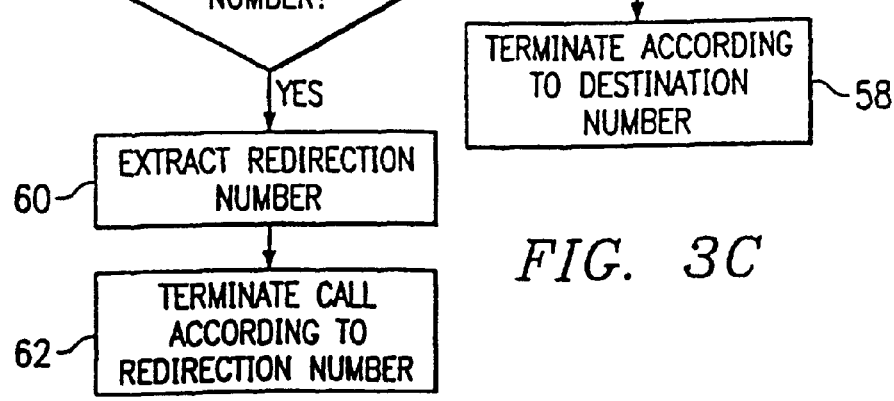

FIGS. 3A–C show the processes performed at each network element in telecommunications network 1. FIG. 3A shows the steps performed at originating service switching point 12. In response to receiving a destination number for a call from an originating subscriber 20 at step 30, originating service switching 12 generates an IAM at step 32 that includes the destination number for interception by signal transfer point 10. At step 34, originating service switching point 12 awaits to receive a return message from signal transfer point 10. Originating service switching point 12 checks to see if signal transfer point 10 indicates whether the destination has been ported at step 35. If the return message indicates that the destination number is not ported, originating service switching point 12 forwards the IAM without change to destination service switching point 13 at step 36. If the return message is a release with cause return message, originating service switching point 12 extracts the redirection number in the release with cause return message at step 38 for placement in the IAM. Originating service switching point 12 then forwards the adjusted IAM to destination service switching point 13 at step 40.

In FIG. 3B, signal transfer point 10 receives the IAM at step 42. At step 44, signal transfer point 10 determines if the destination number has been ported. If not, a return message is sent to originating service switching point 12 at step 46 indicating that no changes are to be made to the IAM. If the destination number has been ported, a database look-up is performed at steps 48 and 50 to obtain a redirection number. At step 52, the redirection number is placed into a return message indicating a release with cause. The release with cause return message is sent to originating service switching point 12 at step 53.

In FIG. 3C, destination service switching point 13 receives the IAM from originating service switching point 12 at step 54. Destination service switching point 13 processes the IAM at step 56. If the IAM does not include a redirection number, destination service switching point 13 terminates the call using the destination number at step 58. If the IAM includes a redirection number, destination service switching point 13 extracts the redirection number from the IAM at step 60 and terminates the call using the redirection number at step 62.

Thus, it is apparent that there has been provided, in accordance with the present invention, an apparatus and method of processing local number portability calls in a signal transfer point of a telecommunications network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of processing local number portability calls in a signal transfer point of a telecommunications network, comprising:

receiving an initial address message associated with a call;

identifying a destination number in the initial address message;

determining whether the destination number has been ported;

generating a return message, the return message including an indication that no changes are to be made to the initial address message in response to a determination that the destination number has not been ported.

2. The method of claim 1, further comprising:

sending a database query in response to a determination that the destination number has been ported.

3. The method of claim 2, further comprising:

receiving a redirection number in response to the database query.

4. The method of claim 3, further comprising:

placing the redirection number into the return message, the redirection number indicating that the initial address message is to be changed to include the redirection number.

5. The method of claim 1, further comprising:

transmitting the return message to initiate processing of the call.

6. A system for processing local number portability calls, comprising:

an originating service switching point operable to receive a destination number from an originating subscriber associated with a call;

a signal transfer point operable to receive an initial address message from the originating service switching point, the initial address message including the destination number, the signal transfer point operable to determine whether the destination number has been ported, the signal transfer point operable to generate a return message for transfer to the originating service switching point, the return message indicating that no changes are to be made to the initial address message in response to the destination number not being ported.

7. The system of claim 6, further comprising:

a terminating service switching point operable to receive the initial address message from the originating service switching point, the terminating service switching point operable to terminate the call according to the destination number in the initial address message.

8. The system of claim 7, further comprising:

a database coupled to the signal transfer point, the signal transfer point operable to send a query to the database in response to the destination number being ported.

9. The system of claim 8, wherein the database provides a redirection number to the signal transfer point in response to the query.

10. The system of claim 9, wherein the signal transfer point generates a return message indicating a release with cause, the return message including the redirection number.

11. The system of claim 10, wherein the originating service switching point receives the release with cause return message, the originating service switching point operable to modify the initial address message with the redirection number.

12. The system of claim 11, further comprising:

a terminating service switching point operable to receive the initial address message from the originating service switching point, the terminating service switching point operable to terminate the call according to the redirection number.

* * * * *